United States Patent [19]

Turner

[11] 4,341,297
[45] Jul. 27, 1982

[54] FEED MECHANISM
[75] Inventor: David L. Turner, Parma, Ohio
[73] Assignee: Litton Industrial Products, Inc., Beverly Hills, Calif.
[21] Appl. No.: 181,823
[22] Filed: Aug. 27, 1980
[51] Int. Cl.³ .................... B65G 29/00; B65G 47/24
[52] U.S. Cl. .................................... 198/408; 72/93; 72/424; 198/457; 198/480; 221/236; 221/263
[58] Field of Search ............... 198/408, 413, 457, 480, 198/481, 391; 72/88, 91, 92, 93, 94, 424; 221/236, 263, 265; 406/62

[56] References Cited
U.S. PATENT DOCUMENTS
2,988,402  6/1961  Policansky ................... 198/457 X
4,195,508  4/1980  Matej ................................... 72/93

Primary Examiner—Jeffrey V. Nase
Attorney, Agent, or Firm—L. V. Granger

[57] ABSTRACT

An indexable rotary cylindrical magazine has part pockets around the periphery parallel to the magazine axis. A guide supplies parts end-to-end to an entrance end of a pocket in a loading position. A reciprocable feed finger engages the downstream end of any part in a pocket at the loading position to index the magazine to the next pocket only if the part is substantially completely received in that pocket at the loading position. Stripper prongs remove the parts from the filled pockets and supply them side-by-side into a part chute. A utilization machine such as a planetary thread rolling machine has a feed mechanism to receive parts from the chute exit and feed them into the threading area. The feed mechanism has feed-in, retract and a dwell range and the parts have approximately twice the length of time to be received in a pocket at the loading position as the time duration of said dwell range. The above description is merely one form of the invention and is not to be construed as limiting on the scope of the invention.

17 Claims, 4 Drawing Figures

FEED MECHANISM

BACKGROUND OF THE INVENTION

When headed metal parts are fed to a utilization machine such as a planetary thread rolling machine they are usually fed in a feed chute supported only at the head with the shank hanging downwardly between flanges of the chute. At the exit end of the chute they are fed side-by-side to the utilization machine. Accordingly, the part needs to move only the width of the head to be in position in front of the feed finger. Accordingly, the sequential feed of such headed parts may be rapid, in the order of 200–300 parts per minute for rapid operation of the thread rolling machine.

Where headless parts are being fed, e.g., those with an Allen head recess in one end to make a headless set screw, then there is no head to be supported by a flanged feed chute and, accordingly, the parts cannot be satisfactorily fed in this manner. As a result the prior art system of feeding headless parts or ones with very small heads is to feed them end-to-end down the feed chute to the utilization machine. However, in such case the parts must drop by gravity or by other urging means in an end-to-end manner into position before the feed finger of the machine. The longer the length of the part, the longer the time period required for the part to drop longitudinally into position. As a result the prior art machines for headless parts operated at about only 90 to 100 parts per minute.

Various systems had been attempted to speed the feed of headless parts, for example, proximity switches had been utilized for the feeding of the parts into position but this still was too slow compared to the feed of headed parts.

Accordingly, the problem to be solved is how to feed headless parts to a utilization machine in a rapid and facile manner. The problem is solved by a feed mechanism to feed parts to a utilization machine, comprising in combination, a frame, a motion changing magazine supported on said frame and having a plurality of wall means establishing elongated substantially parallel part pockets disposed side-by-side, a guide supported relative to said frame to guide elongated parts substantially in the direction of the longitudinal axis of the parts and of said pockets, drive means connected to relatively move said magazine and said guide in a direction transverse to the longitudinal dimension of said pockets with said pockets and said guide sequentially established at a loading position with an upstream end of each pocket in alignment with the downstream end of said guide, said wall means having wall ends sequentially at the downstream end of said guide alternating with said pockets, means urging any said part in said guide toward said magazine to be receivable in an empty pocket at said loading position and to be blocked by a wall end at said loading position, feed means at the utilization machine having an intermittent part feed-in range in a 360 degree cycle, means to supply parts side-by-side from said magazine to said feed means, said feed means connected to feed parts sequentially into said utilization machine during said part feed-in range, and means to actuate said drive means in substantial synchronism with said feed means to have at said loading position a pocket capable of receiving a part for a period of time substantially greater than the time of said feed-in range of the 360 degree cycle.

Accordingly, an object of the invention is to provide a feed mechanism for rapidly feeding headless parts.

Another object of the invention is to provide a motion changing structure which changes the parts from an attitude of end-to-end to one of side-by-side.

Another object of the invention is to provide a motion changing magazine which provides approximately twice the length of time for feeding a part end-to-end as is provided by the dwell range of a utilization machine.

Other objects and a fuller understanding of this invention may be had by referring to the following description and claims, taken in conjunction with the accompanying drawings, in which:

DESCRIPTION OF THE PREFERRED EMBODIMENT

Figure 1:
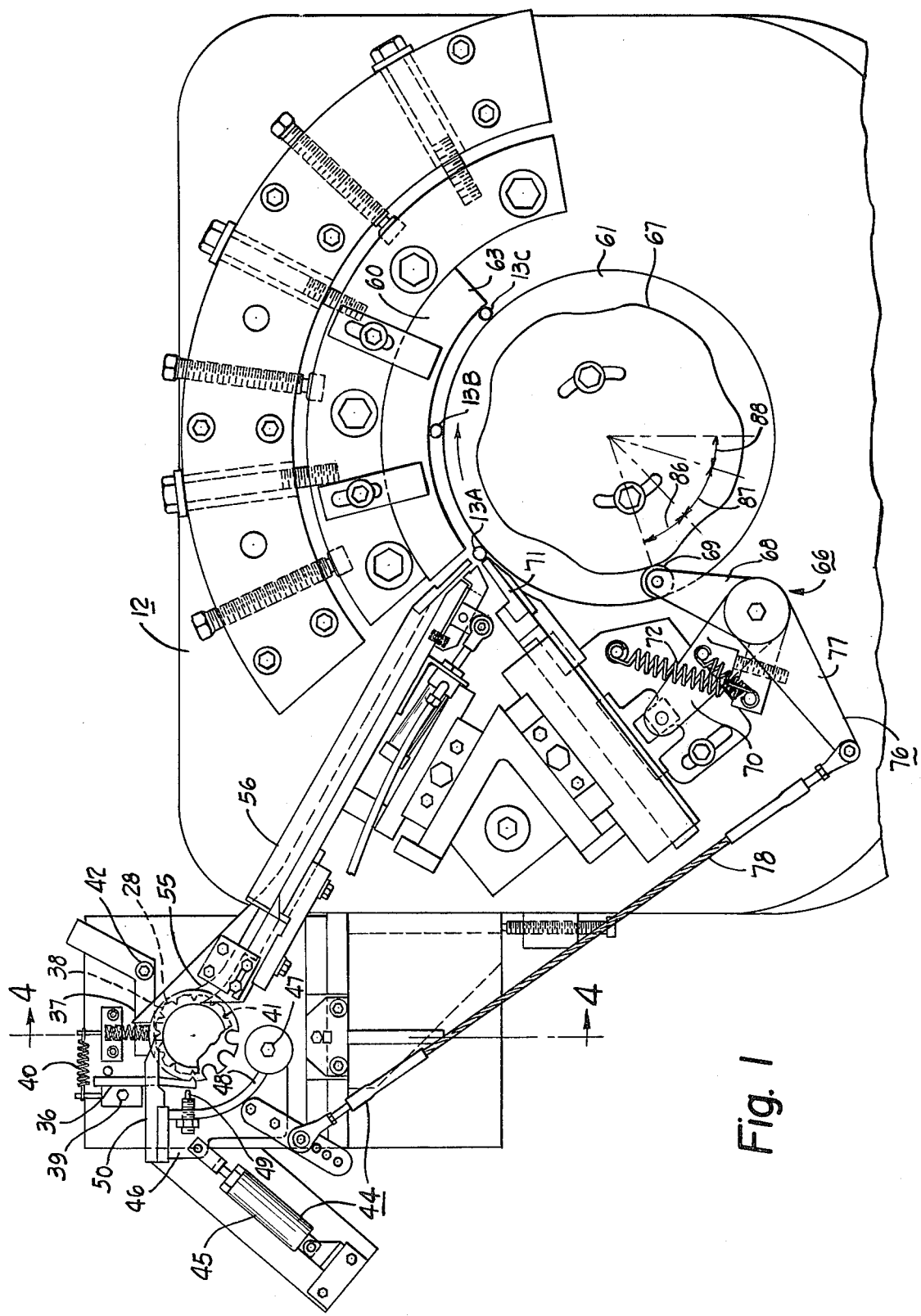
FIG. 1 is an elevational view of a machine embodying the feed mechanism of the invention.
Figure 2:
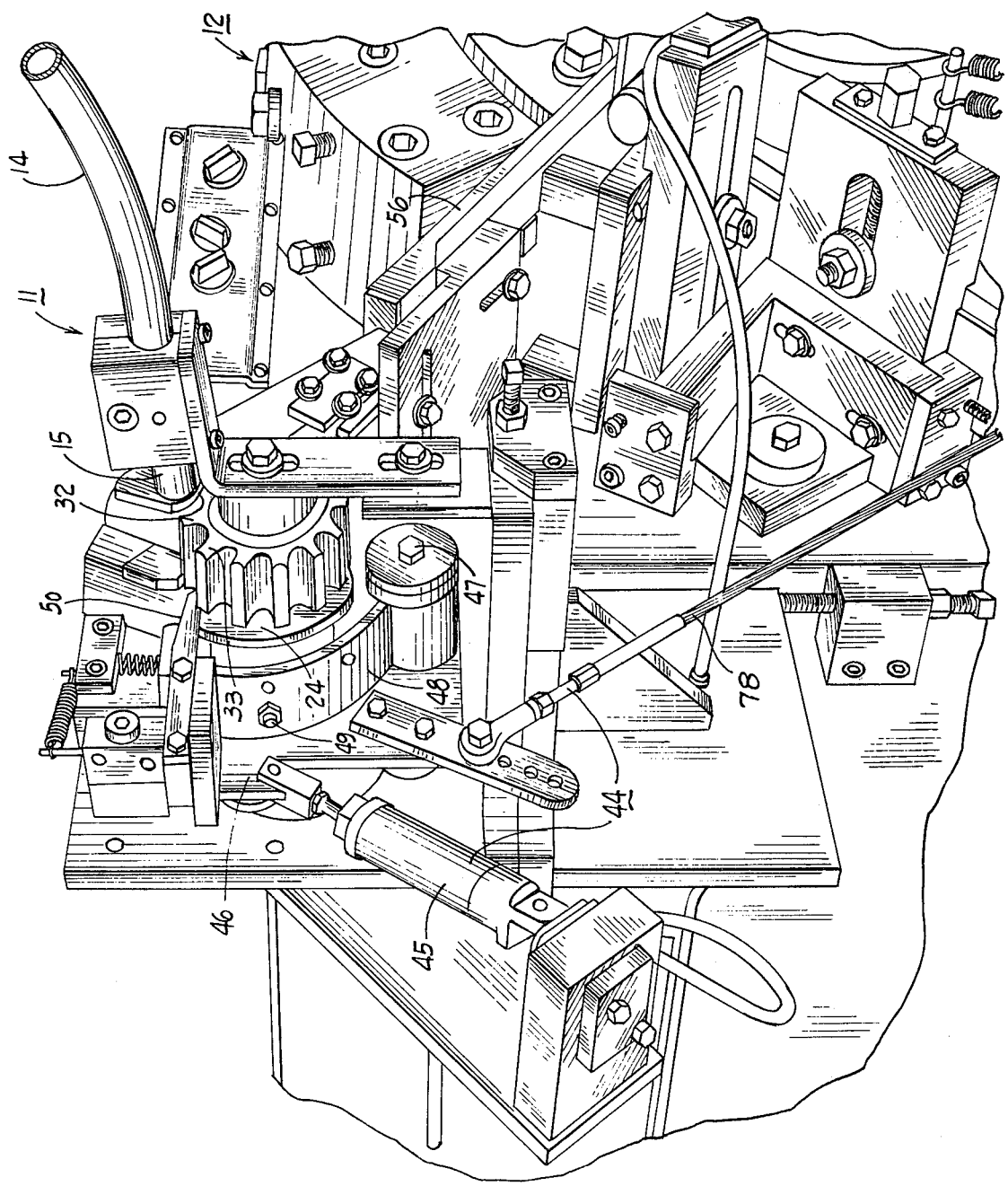
FIG. 2 is a perspective view of the machine from the left side thereof.
Figure 3:
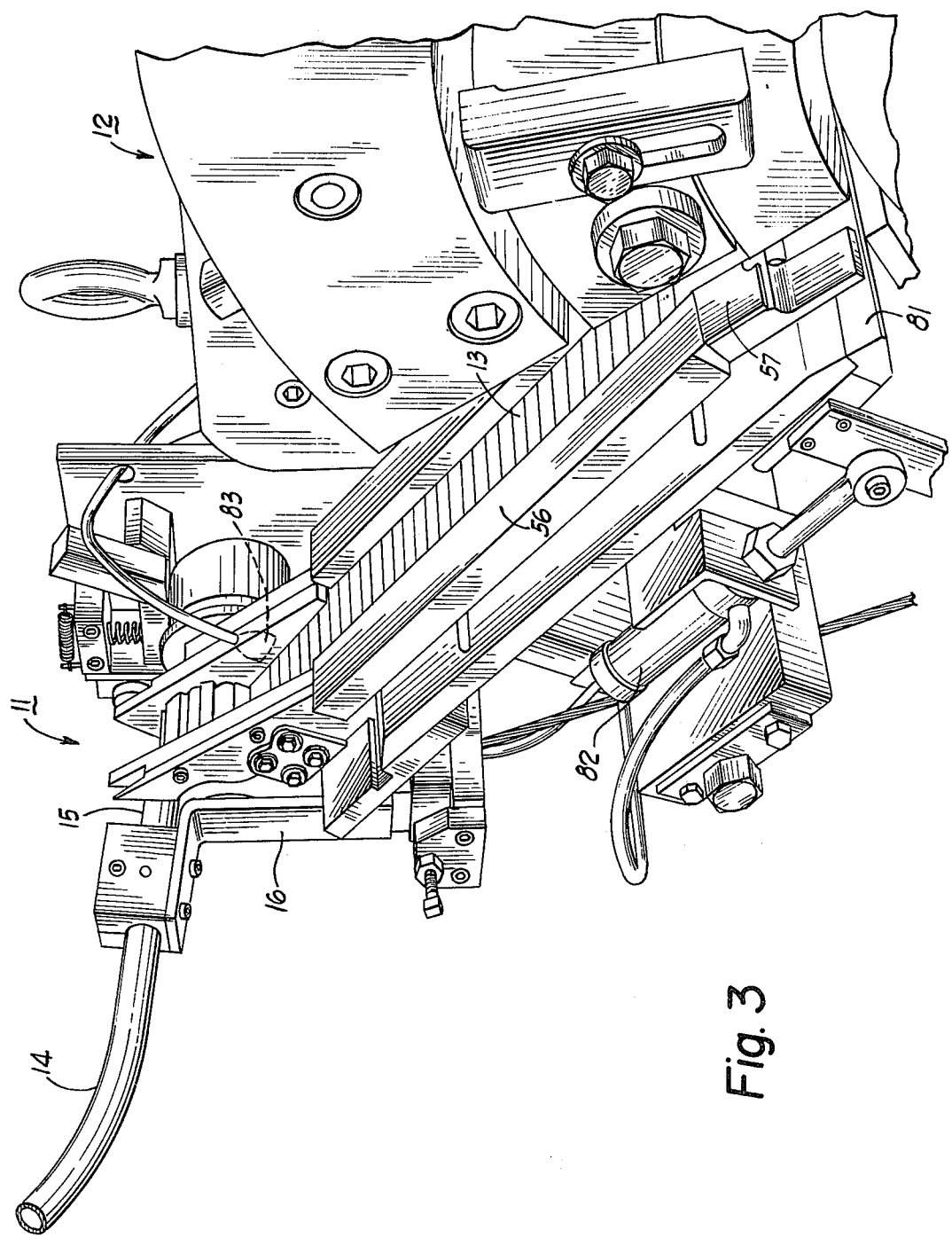
FIG. 3 is a perspective view of the machine from the right side thereof.
Figure 4:
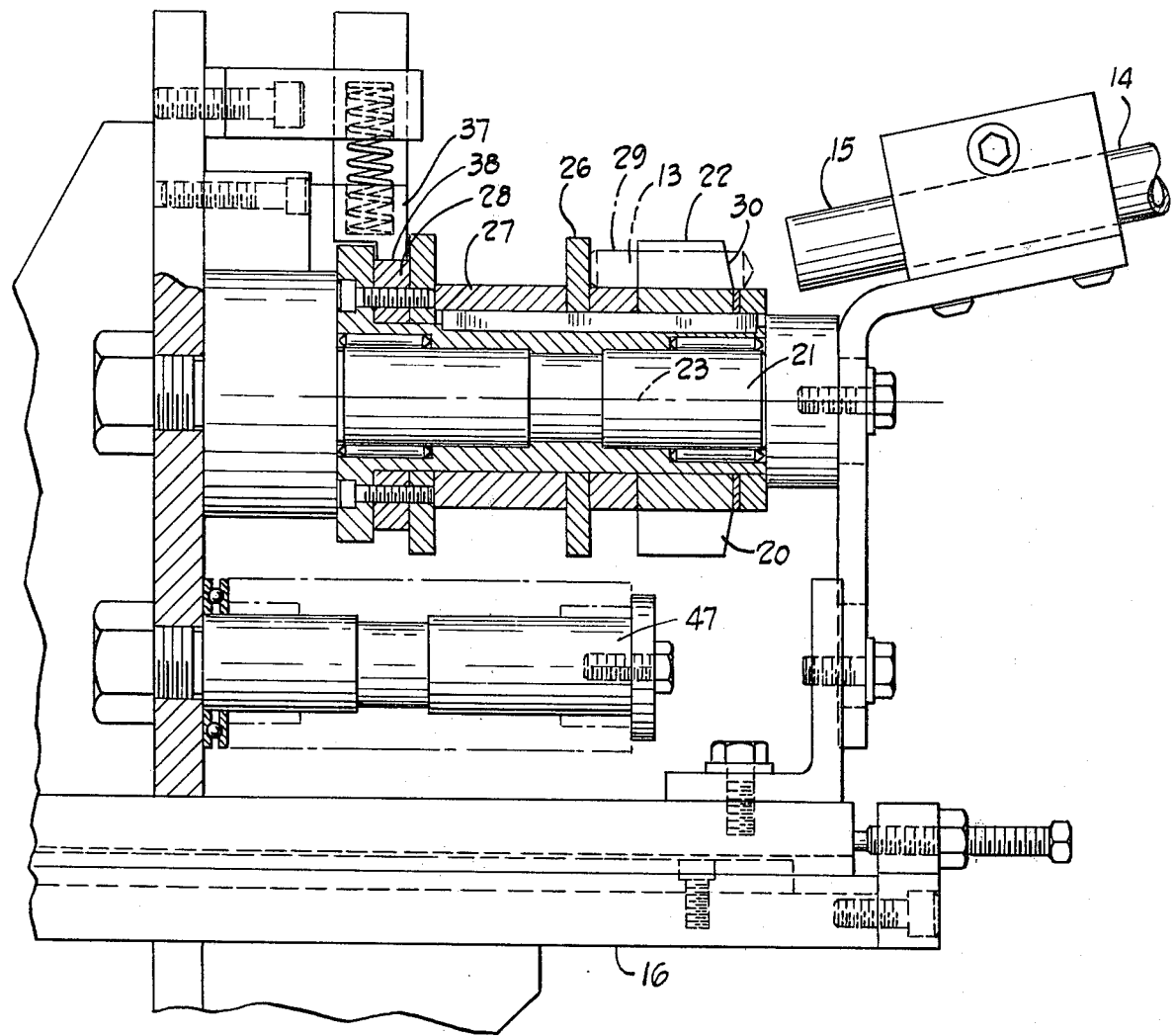
FIG. 4 is a sectional view on line 4—4 of FIG. 1.

The FIGS. 1–4 illustrate a feed mechanism 11 which may be used with a utilization machine illustrated as a planetary thread rolling machine 12. The feed mechanism 11 is especially adapted to feed headless or nearly headless parts 13 which are often difficult to feed because they have no head which may be supported by opposed flanges in a feed chute. The parts 13 are supplied to the feed mechanism 11 by a tube or guide 14 which feeds the parts longitudinally in an end-to-end manner from a supply source which might be a vibratory bowl feeder or a cold header. The cold header might make an Allen shaped recess in one end so that after the part is threaded it will be a headless set screw. Some means such as gravity is provided, or other means, not shown, for urging parts end-to-end through the guide 14 toward the exit end 15 thereof. The feed mechanism has a frame 16 which may be secured to the utilization machine 12. A motion changing magazine 20 is journalled for rotation on a spindle 21 with the guide 14 being fixed. The magazine 20 is in the form of a cylinder and has a plurality of walls 22 parallel to the axis 23 of the spindle 21. These walls 22 define a plurality of pockets 24 also extending parallel to the spindle axis 23.

A washer 26 and a spacer bushing 27 are provided on the spindle 21. A detent wheel 28 is also provided on the magazine 20 and rotates with this magazine. The washer 26 forms a stop wall for the downstream end 29 of any part in a loading position 30 of the magazine 20. Each wall 22 has a wall end 32 at the upstream end thereof which, as the magazine is indexed, forms a block to the entrance of any part from the guide 14. These wall ends 32 are bevelled at 33 to aid the entrance of any part into the respective pocket from the guide 14. The length of the spacer bushing 27 may be changed which will change the axial position of the washer 26 to thereby accommodate different lengths of parts 13.

Detent means is provided by a first detent 36 and a second detent 37. The second detent 37 is a spring urged arm pivoted at 42 with a flat nose adapted to engage any of the twelve flats 38 on the detent wheel 28. The first detent 36 is an arm pivoted at 39 and urged by a spring 40 toward disengagement from a V-shaped recess 41 in the detent wheel 28.

Drive means 44 is provided to establish relative movement between the magazine 20 and the guide 14. In this preferred embodiment the drive means 44 is connected to index the magazine 20 in a single direction, clock-wise as viewed in FIG. 1 The drive means includes urging means 45 which may be a spring but in this embodiment is shown as an air cylinder urging a plate 46 clockwise about a pivot 47. An arm 48 is fixed for rotation with the plate 46 and has a spring-urged plunger 49 engaging the detent arm 36. A feed finger 50 is carried on the outer end of the arm 48 for movement in an arc closely adjacent the upper surface of the magazine 20 and in an axial position between the stop washer 26 and the pocket walls 22. The feed finger is thus in a position, as it moves to the right in FIG. 1, to engage the part 13, and preferably engage the downstream end 29 of any part 13 in the loading position 30 of the magazine 20 to engage that part and index the magazine by one indexable position. In the preferred embodiment this is shown as one-twelfth of a revolution. As the magazine is sequentially indexed, a stripper fork 55 removes the parts from the pockets and guides them to a part chute 56 from whence they fall by gravity to an exit end 57 thereof.

The utilization machine 12 has been illustrated as a planetary thread rolling machine having a stationary arcuate thread die 60 and a rotary cylindrical thread die 61. FIG. 1 illustrates a part 13A at the entrance end 62 of the stationary thread die 60, a part 13B partially roll threaded, and a part 13C which has been completely roll threaded and is ready to exit from the exit end 63 of the stationary thread die 60. The part 13A is ready to be fed to the thread rolling machine 12 by feed means 66. This feed means may be electrically actuated but is shown as being synchronized with the rotation of the machine 12 by utilizing a rotary cam 67 secured to the rotary die 61. The feed means 66 includes a bell crank lever 68 having a cam follower 69 on one end and a feed driver 70 on the other end to actuate a second feed finger 71. The cam 67 has lobes to cause reciprocation of the feed finger 71 with the lobes causing retraction and with the feed-in movement provided by a tension spring 72. By this means parts are intermittently fed to the thread rolling machine 12 as the die 61 rotates.

Actuating means 76 is provided to actuate the drive means 44 in synchronism with the feed means 66. This actuating means in the preferred embodiment includes an arm 77 on the bellcrank lever 68 for movement therewith. The arm 77 is connected to one end of a flexible cable 78 and the other end of this cable is connected to the pivotable plate 46 which is a part of the drive means 44.

A feed stop clamp 81 is provided at the exit of the part chute 56 to act as a gate preventing and permitting the dropping of a single part into the position shown by part 13A in FIG. 1, whereat it is ready for feed into the thread rolling machine 12. This feed stop clamp is actuated by a cylinder 82 which is controlled in actuation by a sensor 83 near the entrance of the part chute 56.

OPERATION

The utilization machine 12 has been illustrated as a thread rolling machine to perform planetary thread rolling on generally cylindrical parts 13. The die 61 rotates clockwise and the parts, such as part 13A entering the entrance end 62 of the stationary die 60 will rotate counter clockwise in a planetary orbit to the position shown by parts 13B and 13C to be threaded and then exit the machine. The feed finger 71 is sequentially actuated by the rotary cam 67 through a feed-in range 86, whereat the part 13A is fed into the machine 12, a retract range 87 and a dwell range 88.

The motion changing magazine 20 changes the attitude of the parts 13 from an end-to-end condition to a side-by-side condition. The parts are touching end-to-end within the guide 14 and supplied by some urging means, not shown. The detent means 36, 37 establishes one of the twelve pockets in the uppermost position which is a loading position 30. The next available part is urged to enter this loading position pocket. When the thread rolling machine 12 starts the feed-in range 86, then the flexible cable 78 is released by the arm 77 and the urging means air cylinder 45 moves the first feed finger 50 to the right as viewed in FIG. 1. If a part has completely entered the pocket at the loading position 30, then the feed finger engages the downstream end 29 of this part to push on the part and, therefore, push the magazine 20 to its next detent position. If a part has not completely entered the pocket at the loading position, then when the feed finger 50 moves forwardly it does not engage any part and as a result the magazine 20 is not indexed. This keeps the quadrant of the magazine 20 from about the twelve o'clock position to the three o'clock position full of parts and they are stripped from the magazine at about this three o'clock position by the stripper fork 55 to have them fall side-by-side into the part chute 56.

As the air cylinder 45 moves the feed finger 50 forwardly and starts the index, the spring urged plunger 49 moves the first detent 36 into engagement with the flats 38 of the detent wheel. The V-nose of the first detent 36 is pushed into the next V-shaped recess 41 to precisely position the magazine 20 and lock it in this position. The second detent 37 also arrests the motion of the magazine at the next indexable position despite any vibration, and when the cam 67 has moved the cam follower 69 such that the flexible cable 78 pulls the feed finger 50 to the left as viewed in FIG. 1, then the first detent 36 will again be disengaged from detent wheel 28 by spring 40, but detent 37 holds the magazine 20 in place.

In one machine constructed in accordance with this invention the cold header supplying parts to the guide 14 operated at 235 parts per minute and the machine 12, feed means 66, and feed mechanism 11 was operated at 245 parts per minute. To assure that the parts chute 56 would be kept full, the sensor 83 permitted the feed stop clamp cylinder 82 to actuate each time at about the start of the feed-in range 86 unless the level of parts in the parts chute 56 fell below the position of the sensor 83. This parts chute being kept full provided proper operation of the parts fed to the second feed finger 71.

The prior art machines which tried to feed headless parts fed them end-to-end to the space at the entrance end 62 of the utilization machine 12. If the parts were long, this dropping by gravity took a considerable length of time and, thus, limited the maximum speed of rotation of the machine 12. For example, parts about one inch long might take so long to drop into feed position that such machine 12 was limited to operating at about 90 to 100 parts per minute. The machine 12 such as a thread rolling machine was capable of roll threading such parts at 250 parts per minute yet was required to be slowed due to the length of time for gravity dropping end-to-end of the parts into feed position.

The present invention eliminates this necessarily slow operation of the machine 12 and permits it to be operated at its normal speed of about 250 parts per minute. The motion changing magazine 20 changes the attitude of the parts from end-to-end to side-by-side and, accordingly, the parts from the parts chute 56 are fed side-by-side into position before the feed finger 71 so that this machine 12 may be operated at 250 parts per minute.

In the prior art machines which were operated by a rotary cam, it will be readily observed that the only time during which a part might drop length-wise into position in front of the second feed finger 71 is at the time period during the dwell range 88. At other times the feed finger 71 would be in the way. This might be 85 degrees during a 360 degree cycle, for example, or 17 degrees out of a 72 degree arc on this five lobe cam 67. With the present invention of the feed mechanism 11, the parts may be fed to the loading position 30 during not only the dwell range 88 but also the retract range 87 for a total of about 235 degrees out of a 360 degree cycle. This provides more than twice as much time for a part to be fed as in the prior art machines and, hence, is the reason why the machine 12 may be operated at more than twice the speed. As soon as a part has been indexed by the indexing magazine 20, the next part leaving the exit end 15 of guide 14 may start to enter the next pocket which is then at the loading position 30. The beveled end 33 of the wall end 32 aids this entry so that the wall end 32 does not block entrance of a new part for any appreciable period of time. This makes certain that the parts are delivered into the magazine 20 in an almost continuous stream rather than having to wait completely throughout the feed-in range 86 and the retract range 87 as in the prior art systems.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A feed mechanism to feed parts to a utilization machine, comprising, in combination,
a frame,
a motion changing magazine supported on said frame and having a plurality of wall means establishing elongated substantially parallel part pockets disposed side-by-side,
a guide supported relative to said frame to guide elongated parts substantially in the direction of the longitudinal axis of the parts and of said pockets,
drive means connected to relatively move said magazine and said guide in a direction transverse to the longitudinal dimension of said pockets with said pockets and said guide sequentially established at a loading position with an upstream end of each pocket in alignment with the downstream end of said guide,
said wall means having wall ends sequentially at the downstream end of said guide alternating with said pockets,
means urging any said part in said guide toward said magazine to be receivable in an empty pocket at said loading position and to be blocked by a wall end at said loading position,
feed means at the utilization machine having an intermittent part feed-in range in a 360 degree cycle,
means to supply parts side-by-side from said magazine to said feed means,
said feed means connected to feed parts sequentially into said utilization machine during said part feed-in range,
and means to actuate said drive means in substantial synchronism with said feed means to have at said loading position a pocket capable of receiving a part for a period of time substantially greater than the time of said feed-in range of the 360 degree cycle.

2. A feed mechanism as set forth in claim 1, wherein said drive means is connected to establish intermittent relative movement between said magazine and said guide in a single direction.

3. A feed mechanism as set forth in claim 1, wherein said drive means is connected to act through any said part at said loading position to act on said magazine for intermittent movement thereof.

4. A feed mechanism as set forth in claim 1, wherein said drive means is connected to act on any said part in a pocket at said loading position to establish motion of said magazine.

5. A feed mechanism as set forth in claim 1, wherein said drive means is mounted to engage a downstream half of any said part in a pocket at said loading position to index said magazine to establish another pocket at said loading position.

6. A feed mechanism as set forth in claim 1, wherein said drive means is mounted to engage near the downstream end of any said part in a pocket at said loading position to move said magazine.

7. A feed mechanism as set forth in claim 1, wherein said drive means is connected to establish intermittent movement of said magazine.

8. A feed mechanism as set forth in claim 7, wherein said drive means includes urging means connected to establish continuous forward urging of said magazine, and said actuating means is connected to restrain movement of said drive means except at cyclical intervals of said feed means of said utilization machine.

9. A feed mechanism as set forth in claim 7, including detent means mounted to restrain movement of said magazine.

10. A feed mechanism as set forth in claim 7, including first and second detent means mounted to restrain movement of said magazine.

11. A feed mechanism as set forth in claim 10, including means connecting said drive means to release said first detent means during the initial movement of said magazine.

12. A feed mechanism as set forth in claim 10, wherein said first detent means locks said magazine in a definite indexed position.

13. A feed mechanism as set forth in claim 1, wherein said drive means includes a reciprocable feed finger mounted to act on one of said magazine and any said part in a pocket of said magazine.

14. A feed mechanism as set forth in claim 13, wherein said feed finger is pivoted on said frame and is intermittently moved by said drive means.

15. A feed mechanism as set forth in claim 13, wherein said feed finger is mounted to reciprocate into engagement with any said part in a pocket at said loading position.

16. A feed mechanism as set forth in claim 1, wherein said magazine is indexable about an axis, and said pockets are substantially parallel to said axis.

17. A feed mechanism as set forth in claim 16, wherein said wall means at the upstream end of each pocket is bevelled to aid receiving a part from said guide.

* * * * *